Jan. 29, 1935.　　　　J. Q. HOLMES　　　　1,989,517
FLASH REMOVING APPARATUS
Filed Nov. 7, 1930　　　4 Sheets-Sheet 1

Inventor
JOHN Q HOLMES
By Spencer Hardman & Feka
His Attorneys

Jan. 29, 1935.　　　　J. Q. HOLMES　　　　1,989,517
FLASH REMOVING APPARATUS
Filed Nov. 7, 1930　　　4 Sheets-Sheet 2
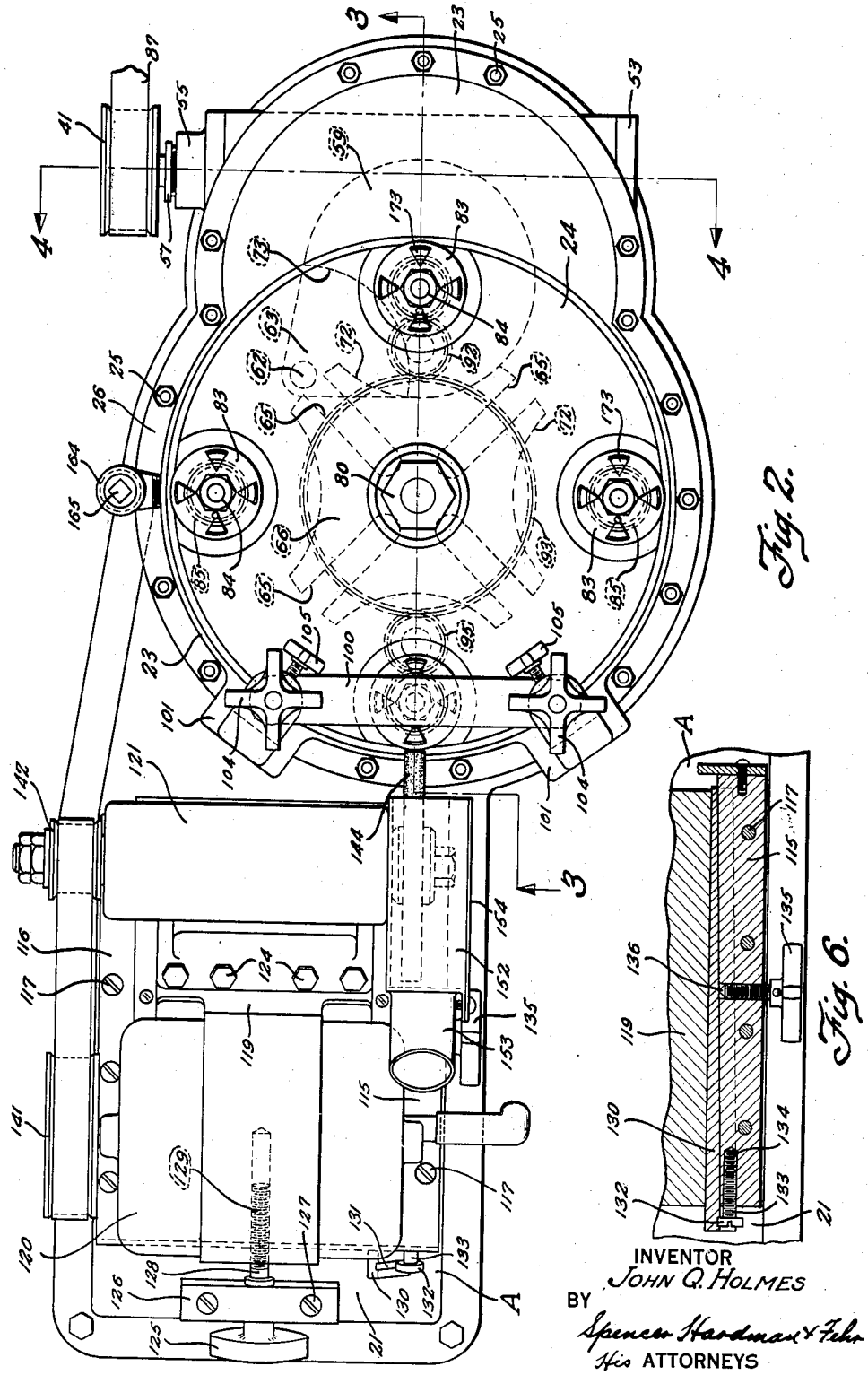
INVENTOR
JOHN Q. HOLMES
BY
Spencer Hardman & Fehr
His ATTORNEYS

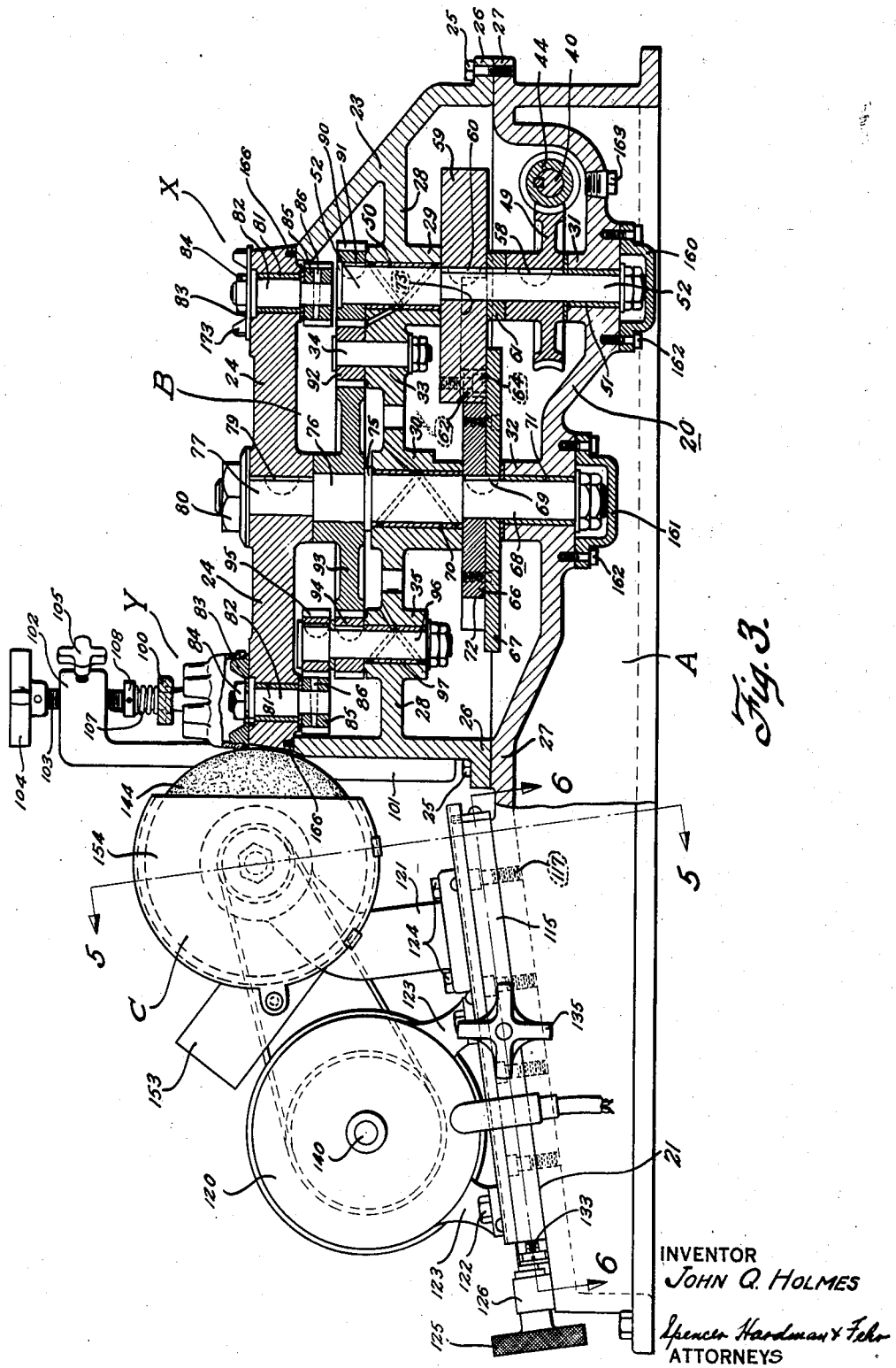

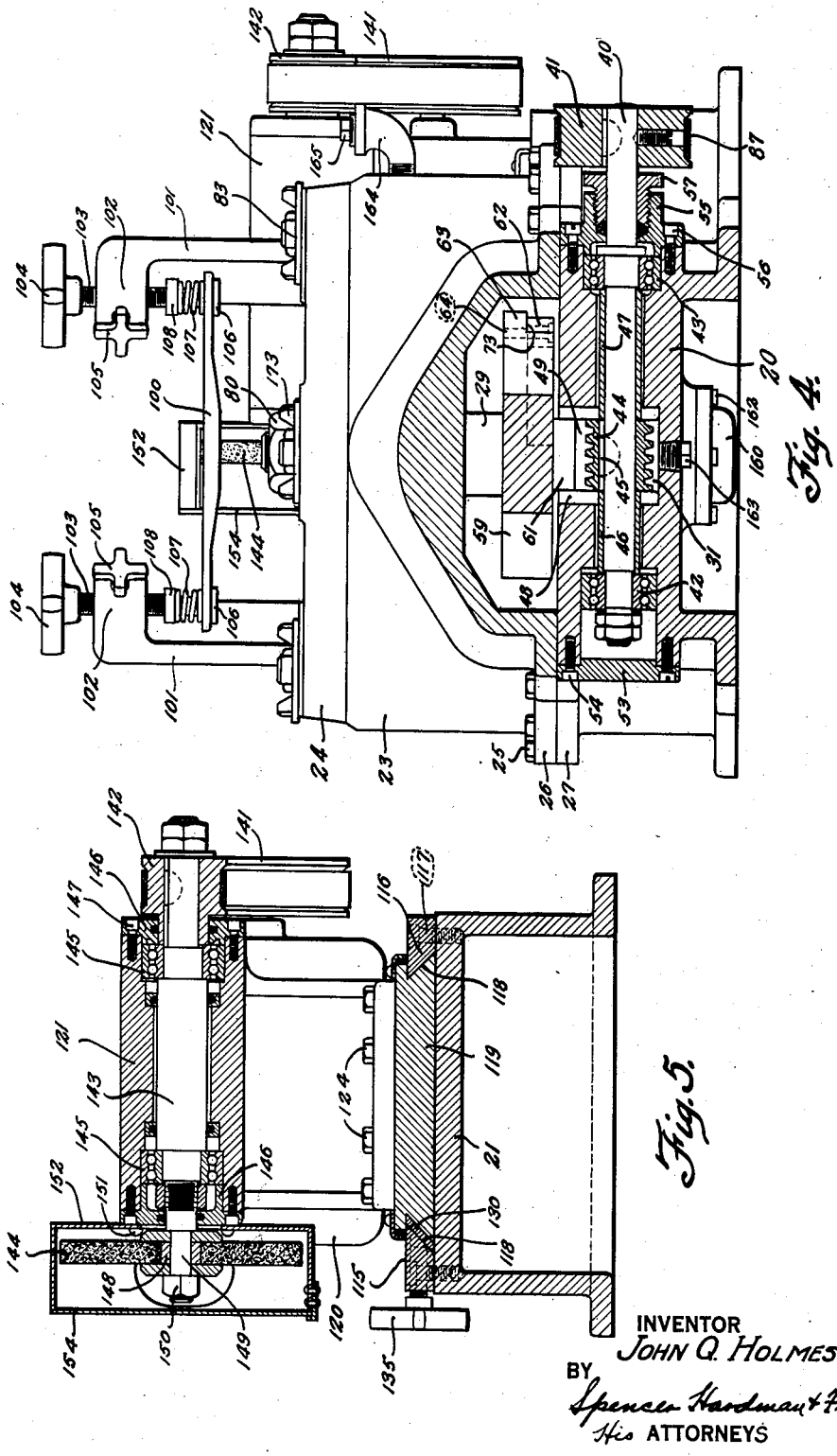

Patented Jan. 29, 1935

1,989,517

UNITED STATES PATENT OFFICE 1,989,517

FLASH REMOVING APPARATUS

John Q. Holmes, Anderson, Ind., assignor, by mesne assignments, to General Motors Corporation, Detroit, Mich., a corporation of Delaware Application November 7, 1930, Serial No. 494,044

8 Claims. (Cl. 51—108)

This invention relates to means and mechanism for dressing or otherwise finishing articles of molded compound, and has for an object to quickly and accurately remove the flash or ragged edge usually left on molded parts formed from bakelite, phenolic hard rubber or other molding compounds, as they come from the press.

This object is carried out by the apparatus disclosed in the instant specification in which a conveyor or work shifting table is provided with a plurality of work receiving fixtures, which by intermittent movement are brought from a loading station to a working station where the work is caused to rotate while in close proximity to a buffer or grinding wheel so positioned as to grind away the flash or ragged edge. Appropriate mechanism is devised to drive the conveyor in step by step or intermittent fashion so as to pause with the work devices at the work station, and while in that station to rotate the same during its proximity to the dressing tool, all of which will be described more in detail in the attendant specification.

Further objects and advantages of the present invention will be apparent from the following description, reference being had to the accompanying drawings, wherein a preferred embodiment of one form of the present invention is clearly shown.

In the drawings:

Fig. 2 is a plan view of the same.

Fig. 3 is a part sectional view of the work holder and means for driving the same, substantially as indicated by the line and arrows 3—3 of Fig. 2.

Fig. 4 is a transverse sectional view of part of the driving mechanism, substantially as indicated by the line and arrows 4—4 of Fig. 2.

Fig. 5 is a transverse sectional view through the apparatus substantially as indicated by the line and arrows 5—5 of Fig. 3.

Fig. 6 is a detailed sectional view substantially as indicated by the line and arrows 6—6 of Fig. 3.

Figure 1:
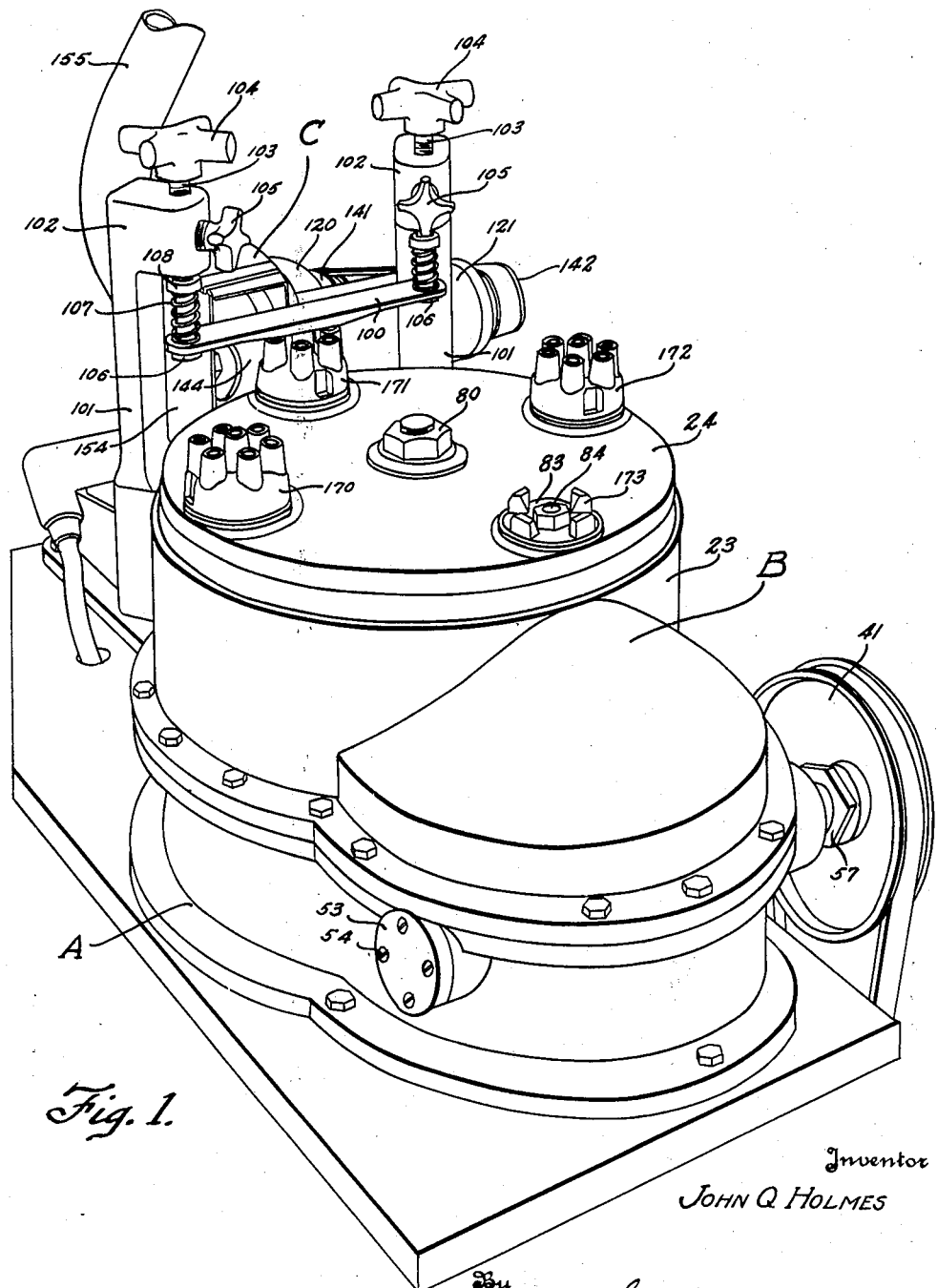
Fig. 1 is a view in perspective of an apparatus according to the present invention designed for the removal of the flash or burr on molded bakelite parts such as ignition distributor caps.

In the manufacture of molded parts from such compounds as bakelite, black or brown molding compounds, hard rubber etc., the castings usually come from the press with sharp burrs or rough edges, or flashes as they are commonly called, which must be removed before the parts can be put into use. Various methods have been used in the removal of this flash from the molded parts, all of which are either objectional or undesirable by reason of the breakage and destruction of the parts due to the method followed. The applicant has therefore devised a method of removing the flash from the molded parts by mechanism that will handle the parts at high speed without subjecting them to rough usage whereby the cost of production of the molded parts can be materially reduced.

The foundation member A is fashioned to provide a bowl or lubricant receiving chamber 20 and bearing bosses for journalling of the mechanism B at one end, and has joined thereto an inclined base 21 making provision for mounting the work dressing mechanism C both of which will be described hereinafter. The chamber 20 forms part of a gear housing that with the wall structure 23 and a turn table 24 journalled as hereinafter provided substantially enclose all of the work driving and shifting mechanism. The wall structure 23 is held to the base in any desirable manner, as by the cap screws 25 engaging the meeting flanges 26 and 27 respectively, and the part 23 further includes a web or partition 28 having bosses 29 and 30 providing bearings in alignment with other bearings in bosses 31 and 32 respectively in the bottom of the bowl 20. The web 28 also provides a boss 33 to receive a pin 34, and still another boss 35 providing a third bearing as will presently appear. The structure journalled within the housing thus provided may be conveniently grouped into work shifting mechanism, the work driving mechanism, and therefore will be described in that order.

Work shifting mechanism

The work shifting mechanism includes a power shaft 40 keyed to a driving pulley 41 and having bearings 42 and 43 at one end of the bowl 20, the shaft having a worm gear 44 fixed thereto as by key 45 and spaced from the said bearings by sleeves 46 and 47. The bowl 20 is appropriately chambered at 48 for reception of the worm wheel 44, and makes provision for its engagement with a worm wheel 49 journalled in bearing sleeves 50 and 51 carried in the bosses 29 and 30 by means of a shaft 52. At one end of the shaft 40 the foundation member is provided with a cap plate 53 and screws 54 by which the end of the shaft 40 is protected and the housing is sealed against leakage of grease. Near the other end of the shaft 40 the foundation member has provision for supporting the bearing 43 and includes a sleeve 55 retained thereon by screws 56 and receiving a gland nut 57 sealing the casing against leakage about the shaft 40. The worm wheel 49 is drivingly engaged by the shaft 52 by means of a key 58 and thence has driving engagement with a crank 59 by means of a key 60, the crank being spaced from the worm wheel by aid of the member 61.

The crank 59 provides a roller 62 near the end of an extension 63 by means of a cap screw 64, the roller being designed to engage slots 65 of a Geneva gear 66 mounted on a plate 67 both of which are keyed to a shaft 68 as at 69, which shaft is journalled in sleeves numbered 70 and 71 carried by the bosses 30 and 32 respectively. The Geneva gear 66, aside from the slots 65 also provides arcs 72 joining the slotted arms and of such curvature as to mate up with the circumference of the crank member 59, and the said crank member is cut away or provided with a clearance as at 73 to allow passage or sweep of the arms of the Geneva gear when the slot 65 thereof is engaged by the roller 62 of the crank. After passing through the bearing 70 the shaft 68 is provided with a collar 75 and a journal portion 76 beyond which is a reduced pintle 77 to which is secured the work table or conveyor 24 by means of a key 79 and which is held thereon by aid of a nut and washer device 80. The table 24 provides a plurality of bearing sleeves 81 for the reception of pintles 82 secured to work receiving devices 83 by means of nut or screw devices 84, and the pintle 82 is keyed or otherwise secured to a pinion 85 as by a taper pin 86.

The work shifter mechanism is thus completed and it is readily seen that power applied to the drive pulley 41, as by means of belt or other well known device 87, will in turn drive the shaft 40 and through the agency thereof the worm gear 44, worm wheel 49 and shaft 52 that causes the continual rotation of the crank member 59. The Geneva gear 66 and its driver 59 are so associated, and their cooperating parts so designed, that the roller 62 will engage the slot 65, it being tangent to the movement of the roller at that point, and start it in gradual movement as the roller enters the slot and thence gradually brings it to a stop as the crank passed to the other extreme of pin and slot engagement, thus causing a periodic movement of the Geneva gear and consequently all structure that is drivingly secured thereto. During the while the arms of the gear on either side of the slot 65 enter into and sweep about the chamber provided by the clearance 73 of the crank 59. As hereinabove stated, the shaft 68 is rigidly keyed to the Geneva gear and through it is driven the table 24 whereby it is caused to rotate in synchronism with the Geneva gear 66, and by it the work receiving devices 83 are revolved in succession to a loading position and a working position indicated at X and Y respectively of Fig. 3.

Work driving mechanism

The work driving mechanism includes some of the work shifting mechanism and more. The power shaft 40 with its means and mechanism for driving the shaft 52 are common to both mechanisms, and in addition thereto the shaft 52 is in driving engagement with a pinion 90 by means of a key 91, and the pinion 90 drives an idler 92 rotatable about the pin 34 and is designed to transmit motion to a larger sprocket 93 journalled upon the portion 76 of the shaft 68. Driven by the sprocket 93 is another pinion 94 in driving engagement with a spur 95 both of which are keyed to a stud shaft 96 carried by bearing sleeve 97 provided by the boss 35 hereinabove referred to. The spur 95 is designed to mesh with any one of the pinions 85 carried by the work devices, whenever the said devices are revolved into the work station. In other words, during the operation of the apparatus whenever one of the work devices is brought into position at the work station, its pinion 85 is engaged by the spur 95, whereupon the work device is caused to rotate with respect to the table 24 through the following train of mechanism, such rotation being at least more than one complete turn. The pulley 41 driving the power shaft 40 communicates motion to the shaft 52 by the worm and worm wheel engagement heretofore mentioned, and thence by reason of the gears 90, 92, 93 and 94 associated with the shafts 52, 34, 76 and 96 cause the spur 95 to drive the pinion 85. It will be observed that upon subsequent step movement of the work shifting mechanism, the work device illustrated will be carried to another station and a succeeding work device brought into position at the work station, whereupon the above described cycle of movement will be repeated.

When the work devices are brought to the work station Y they pass beneath a presser bar 100 where they come into engagement with, and are rotated while in such engagement with, a work dressing mechanism as indicated by C. Means are provided to support the work presser bar 100, in that risers 101 are fixed adjacent the housing 25 and in the proximity of the work station, and each riser has a lateral extension 102 that is threaded to receive a screw 103 that may be turned by the hand wheel 104. Locking screws 105 are threaded into the lateral extensions to engage the screws 103 when they are run in or out to the desired position. The lower ends of the screws 103 are headed at 106 to provide retaining provisions for each end of the presser bar 100, and a spring 107 engaging the end of the bar 100 being coiled about the lower end of a screw 103 engages a collar 108 secured to the screws 103 and operates as a tension means for the bar 100. The bar is tapered from its central portion toward either end so as to engage over the tops of the work pieces as the same are revolved into position thereunder, and hold them firmly in place at the work station.

Work dressing mechanism

As hereinabove stated, the foundation member A provides an incline 21 upon which is mounted the work dressing mechanism C. To the inclined base, on either side of the central line, there are fixed guide rails or ways 115 and 116 as by screws 117, with their opposing faces inclined or dovetailed as indicated at 118 in Fig. 5, and within this guideway so formed there is mounted a base 119 of the aforesaid dresser mechanism to which is secured a driving motor 120 and a bearing bracket 121 as will presently appear. The motor may be attached to the base 119 in any desired means as by the cap screws 122 through appropriate legs or lugs 123, while the bearing bracket 121 may be secured to the base by the screws 124. Thus, both the motor 120 and the bearing bracket 121 supporting the dressing fixture are mounted upon the base 119 in rigid relation to each other, and are thus slidable as a unit upon the inclined base 21 between the guides 115 and 116. This makes provision for adjustment of the dressing mechanism to and from the work position indicated at Y at Fig. 3. The movement of the work dressing mechanism on the base 21 is accomplished by means of a hand wheel 125 carried by a cleat 126 provided by the back end of the incline 21. The cleat may be affixed to the base in any preferred means as by screws 127, or in fact may be a boss integral therewith. In any event the hand wheel with its threaded shaft 128 is capable of rotation within the cleat but incapable of lineal movement therein, and has its forward end threaded to engage the base member as at 129 making provision for slow motion movement of the base with its motor and bearing bracket along the incline.

Provision is made for holding the dresser unit in the particular position to which it has been moved, and for locking the holding means as will now be described. A long, slim wedge 130 is inserted within the dove-tailed slot or space between the rail 115 and the base 119, the thickened end of the wedge having a transverse slot 131 for reception of a head 132 of a screw 133 threaded in the end of the rail 115 at 134. Transverse to the guide rail 115 there is threaded a hand wheel 135, the point of which is designed to engage the wedge 130 as at 136. By this structure, provision is made for locking the dresser in the particular position to which it has been moved by the hand wheel 125 and is accomplished in the following manner. When the desired position has been obtained the screw 133 is run into the end of the rail 115, the head 132 thereof engaging in the slot 131 carries with it the wedge 130 driving it firmly into the space between the base 119 and the rail 115. Upon the accomplishment of this so that the elements are firmly fixed, the hand wheel 135 is then turned to drive the point of its associated stud into the wedge as indicated at 136, thus preventing the withdrawal of the wedge from the slot.

The motor 120, as is usual, has a motor shaft 140 fitted with a driving pulley 141 belted or otherwise geared to a driven pulley 142 keyed to a shaft 143 and operating to drive a grinder 144 positioned to engage the work piece as it comes to the work station Y beneath the presser bar 100. The shaft 143 is supported in appropriate bearings 145, both of which are carried by the bearing bracket 121 hereinbefore referred to, the bearings being retained within the bracket by customary rings 146 secured thereto by screws 147. The grinding wheel 144 is usually provided with a hub portion 148 retained upon a reduced spindle 149 of the shaft 143 by a nut 150. Secured to the bracket in any preferred manner as by screws 151, there is a hood 152 that terminates in a tubular extension 153 and covered by a removable lid 154. To the member 153 may be connected a conduit 155 leading to an exhauster by which refuse from the working station may be drawn off.

The apparatus thus constructed is substantially ready for operation, it being only necessary to place within the gear housing provided by the members 20 and 23 a sufficient quantity of lubricant to properly bathe the working parts, and thence connect the apparatus with a source of energy by which it is to be driven. The bottom of the member 20 provides caps 160 and 161 held thereon by screws 162 that protect the ends of the shafts 52 and 68 and stop leakage of the lubricant from the bowl 20 through the bearings. For convenience in draining the member 20, a plug 163 is provided, and a fresh supply of lubricant may be added through the port in the filter pipe 164 carried by the member 23 and covered by a plug 165. This portion of the housing is further provided against leakage by the absorbent material 166 reposing within an annular groove of the work table 24 substantially as illustrated in Fig. 3.

The apparatus thus constructed is particularly adaptable for removing the flash from molded bakelite distributor caps such as those indicated at 170, 171 and 172 in Fig. 1, and the work devices 83 are particularly fashioned for their reception by providing them with lugs 173 which are circumferentially spaced, slightly tapered on their periphery and slightly inset from the periphery of the device 83 so as to receive the hollowed or chambered portion of the cap substantially as indicated in Figs. 1 and 3. It is obvious that this portion of the apparatus might be altered without invention to accommodate other forms of work pieces, but in all events the work devices 83 are so designed as to receive and position the pieces to be worked upon, carry them to a point beneath the presser bar 100, and while at that point in the work station rotate the work pieces such that they will be successfully acted upon by the work dressing apparatus.

*Operation*

Assuming that the several motors driving the work shifter mechanism, the work driving mechanism and the work dressing mechanism are in operation, then the following cycle of movements will obtain. The pulley 41 driving the shaft 40, and from that the two shafts 52 and 68, cause the periodic or step by step rotation of the work table 24, which table rotation revolves the work devices 83 bringing them successively from the loading position at the forward part of the apparatus where the work pieces may be loaded on the work fixture, to the work station beneath the presser bar 100, at which time the conveyor movement is arrested, and where the work fixture is caused to rotate by the gearing heretofore set out. Thence the Geneva gearing produces another step in the motion of the conveyor table, to remove the dressed work piece from the work station, and present another one to be worked upon. In substance, a stream of work pieces passes the work station in rapid succession, to where they pause only long enough to be dressed up, and thence go on to a point where they may be removed, its place being taken by another of undressed condition.

The dresser mechanism C is so associated with respect to the work station, that the above recited movements of the table with the work fixtures loaded with work will bring the work piece into engagement with the grinder 144, which being driven by the motor 120, grinds away the flash of the molded article. The work driving mechanism, of course, rotates the work piece relative to the table 24 and the grinder 144 so that all of the flash about the molded piece is removed by the grinder 144. By the time this has been accomplished the Geneva gearing will operate to turn the table 24 through succeeding steps, moving the dressed work piece from beneath the presser bar 100, and will have moved another work piece beneath the same. The dressed work piece may then be moved from the work fixture which may then be loaded with another to be worked upon. The contributing mechanisms of the apparatus are so correlated as to provide substantially continuous operation, by means of which a large number of work pieces may be dressed within a single unit of time.

While the form of embodiment of the present invention as herein disclosed, constitutes a preferred form, it is to be understood that other forms might be adopted, all coming within the scope of the claims which follow.

What is claimed is as follows:

1. In apparatus for removing flash from molded articles, the combination comprising, a rotatable conveyor having a plurality of angularly spaced workholders; a rotatable grinding wheel located at a work station of the conveyor; and a spring pressed sloped bar adapted to engage and gradually clamp the article to its workholder while the same approaches the work station.

2. In apparatus for removing flash from molded articles, the combination comprising, a rotatable conveyor having a plurality of angularly spaced workholders; a rotatable grinding wheel located at a work station of the conveyor; and a spring pressed double sloped bar adapted to engage and gradually clamp an article to its workholder while the same approaches the work station and gradually to release the article when its workholder is moving away from the work station.

3. In apparatus for removing flash from molded articles, the combination comprising, a grinder; a turntable having a plurality of workholders; driving mechanism for intermittently rotating the turntable in order to successively bring the workholders from a loading position to a work position adjacent the grinder and for rotating a workholder upon arrival in the work position; and a spring pressed sloped bar adapted to engage and gradually clamp an article to its workholder while it approaches the work position.

4. In apparatus for removing flash from molded articles, the combination comprising, a grinder; a turn-table having a plurality of work-holders; driving mechanism for intermittently rotating the turn-table in order to successively bring the workholders from a loading position to a work position and for rotating a work-holder upon arriving in the work position adjacent the grinder, and a spring pressed double sloped bar adapted to engage and gradually clamp an article to its workholder while it approaches the work position and to gradually release the article when moving away from the work position to loading position.

5. Apparatus for removing annular flash from a molded article having a circular wall coaxially of the flash comprising, in combination, a rotatable workholder including a plurality of angularly spaced lugs having tapered concentric peripheries adapted to receive and engage the internal surface of the circular wall of an article; means for exerting pressure on the article in order to press the circular wall thereof against the tapered peripheries of the workholder lugs; a rotatable grinding wheel; and means for causing relative bodily movement between the workholder and the grinding wheel.

6. Apparatus for removing annular flash from molded articles having a circular wall coaxially of the flash comprising, in combination, a rotatable conveyor; a plurality of angularly spaced workholders rotatably mounted on the conveyor, each of said workholders having a tapered concentric periphery adapted to receive and engage the internal surface of the circular wall of an article; a rotatable grinding wheel located at a work station of the conveyor; and a spring pressed sloped bar adapted to engage and gradually press the article with its internal wall surface against the tapered periphery of the workholder while the latter approaches the work station and to maintain the article pressed against the workholder while the latter is at the work station.

7. In an apparatus for removing annular flash from molded articles, each having an annular rim whose axis is parallel to the axis of the flash, the combination comprising, a grinder; a turn-table; a plurality of work-holders, each comprising a plurality of lugs having tapered surfaces adapted to engage portions of the annular rim of a molded article, said lugs being carried by the turn-table for rotation about the axis of the flash; a driving mechanism for intermittently rotating the turn-table in order successively to bring the work-holders from a loading position to a work position and for rotating a work-holder upon arrival in the work position adjacent the grinder; and a spring pressed sloped bar adapted to engage and gradually clamp an article to the lugs of a work-holder while the latter approaches the work position and for maintaining the article clamped to said lugs while in the work position.

8. In an apparatus for removing annular flash from molded articles, each having an annular rim whose axis is parallel to the axis of the flash, the combination comprising, a grinder; a turn-table; a plurality of work-holders, each comprising a pair of lugs having tapered surfaces adapted to engage diametrically opposite portions of the annular rim of an article, said lugs being carried by the turn-table for rotation about the axis of the flash; a driving mechanism for intermittently rotating the turn-table in order successively to bring the work-holders from a loading position to a work position and for rotating a work-holder upon arrival in the work-position adjacent the grinder; and a spring pressed double sloped bar adapted to engage and gradually clamp an article to the lugs of a work-holder while the latter approaches the work position, to maintain the article clamped to said lugs while in the work position and gradually to release the pressure upon the article when the latter moves away from the work position to loading position.

JOHN Q. HOLMES.